United States Patent
Hashiba et al.

(10) Patent No.: US 8,025,959 B2
(45) Date of Patent: Sep. 27, 2011

(54) INTERIOR MATERIAL FOR VEHICLE

(75) Inventors: Masanori Hashiba, Mizunami (JP); Makoto Hattori, Anjo (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 12/815,450

(22) Filed: Jun. 15, 2010

(65) Prior Publication Data

US 2010/0323182 A1    Dec. 23, 2010

(30) Foreign Application Priority Data

Jun. 17, 2009    (JP) .................................. 2009-144522

(51) Int. Cl.
*B32B 27/04*    (2006.01)

(52) U.S. Cl. ..................... 428/300.7; 525/92 R; 525/190

(58) Field of Classification Search .................. 428/365, 428/300.7; 525/92 R, 190
See application file for complete search history.

(56) References Cited

U.S. PATENT DOCUMENTS

| | | | | |
|---|---|---|---|---|
| 4,366,281 A | * | 12/1982 | Abe et al. ...................... | 524/297 |
| 6,946,182 B1 | * | 9/2005 | Allgeuer et al. ................ | 428/92 |
| 7,077,986 B2 | * | 7/2006 | Kurihara et al. .............. | 264/45.5 |
| 7,080,712 B2 | * | 7/2006 | Tsuiki et al. ................... | 181/204 |
| 7,144,623 B2 | * | 12/2006 | Shin ............................ | 428/304.4 |
| 7,479,313 B2 | * | 1/2009 | Chang et al. .................... | 428/31 |
| 2003/0168767 A1 | * | 9/2003 | Kurihara et al. ................ | 264/51 |
| 2005/0119408 A1 | * | 6/2005 | Shin ................................ | 525/88 |
| 2008/0063847 A1 | * | 3/2008 | Chang et al. .................. | 428/213 |
| 2009/0286906 A1 | * | 11/2009 | Shi et al. ......................... | 524/47 |
| 2009/0324901 A1 | * | 12/2009 | Hashiba et al. ............. | 428/195.1 |
| 2010/0323182 A1 | * | 12/2010 | Hashiba et al. ............. | 428/297.4 |

FOREIGN PATENT DOCUMENTS

JP    2005-231134    9/2005

OTHER PUBLICATIONS

Fumitoshi Akaike et al., "Skin Material of Vehicle Interior Equipment and Manufacturing Method for the Same", U.S. Appl. No. 12/757,198, filed Apr. 2010.

* cited by examiner

*Primary Examiner* — N. Edwards
(74) *Attorney, Agent, or Firm* — Greenblum & Bernstein, P.L.C.

(57) ABSTRACT

The present invention is an interior material for a vehicle having a skin layer and a base layer. The skin layer contains an olefin-based thermoplastic elastomer, a polyolefin resin, a polylactic acid resin and a styrene-based thermoplastic elastomer, in amounts of respectively 20% to 70% by weight, 10% to 50% by weight, 5% to 30% by weight and 5% to 30% by weight based on 100% by weight of the total of these. The base layer is preferably a thin layer in which a natural fiber is dispersed in a phase of a thermoplastic resin such as a polyolefin resin, or a polyurethane foam layer.

10 Claims, 4 Drawing Sheets

F I G. 4 (C)
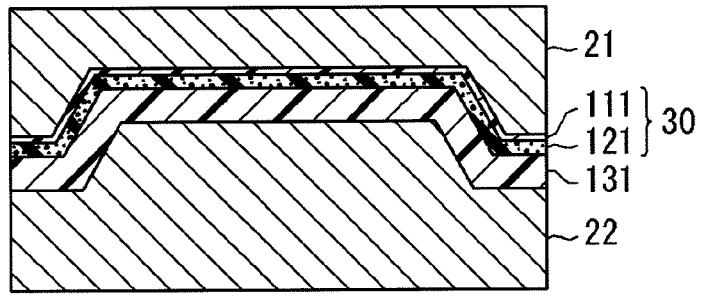
F I G. 4 (D)
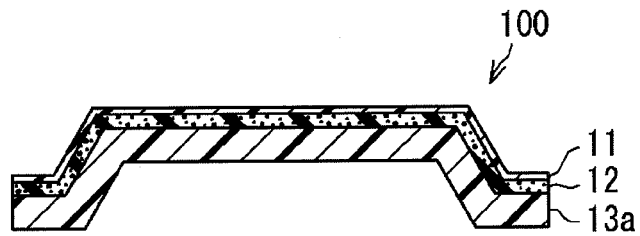
F I G. 5 (A)
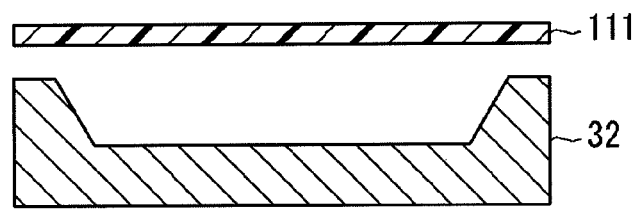
F I G. 5 (B)
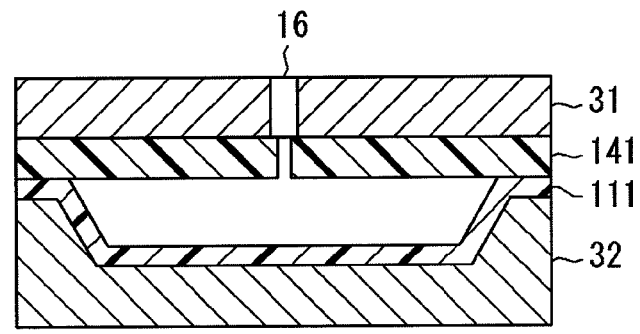

F I G. 5 (C)
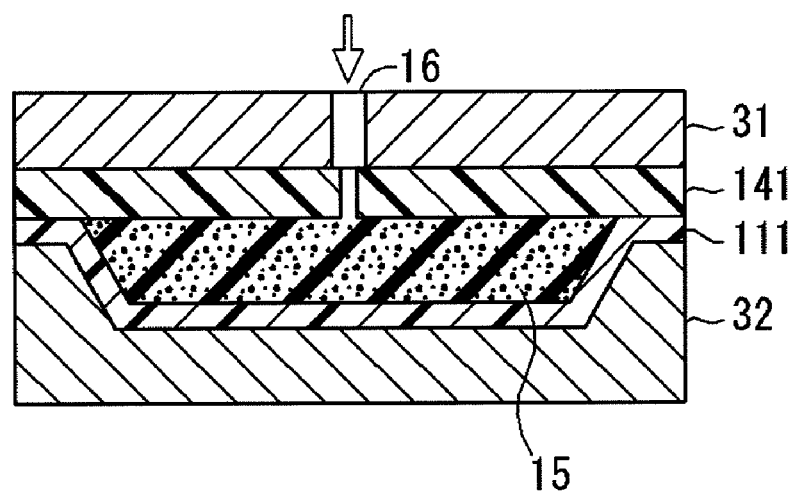
F I G. 5 (D)
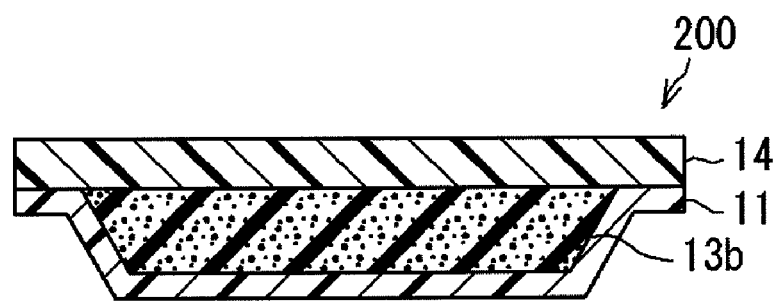

INTERIOR MATERIAL FOR VEHICLE

INCORPORATION BY REFERENCE

The present application claims priority under 35 U.S.C. §119 of Japanese Patent Application No. 2009-144522, filed on Jun. 17, 2009, the disclosure of which is expressly incorporated by reference herein in its entirety.

BACKGROUND OF THE INVENTION

1. Field of the Invention

The present invention relates to an interior material for a vehicle. More specifically, the present invention relates to an interior material for a vehicle, including a skin layer which is obtained using a thermoplastic elastomer and a polylactic acid resin that is a plant-derived material, the skin layer being wrinkle-free and having excellent light resistance, tensile properties and abrasion resistance.

2. Related Art

Thermoplastic elastomers used for the formation of a skin layer for an interior material for a vehicle are known to be more eco-friendly than conventional vinyl chloride resin (see, for example, Japanese Patent Application Publication No. JP-A 2005-231134). Automobile interior and exterior components described in this document are composed of a thermoplastic elastomer such as a specific styrene thermoplastic elastomer which is totally made of a petroleum-derived material. In view of recent global warming problems, there is an increasing need for the use of a plant-derived material with the purpose of reducing carbon dioxide emission on the basis of the concept of carbon neutral. Accordingly, the use of a plant-derived material is also required for the formation of a skin layer and the like in an interior material for a vehicle.

SUMMARY OF THE INVENTION

The use of a plant-derived material for the formation of a skin layer is required as described above. However, a polylactic acid resin, which is often used as a plant-derived material, is so hard that it is unsuitable as a starting material for the skin layer which is required to have flexibility. Furthermore, it is not easy to uniformly mix a polylactic acid resin with a thermoplastic elastomer. If the mixture is not uniform, a skin layer forming material may cause drawdown during forming to make wrinkles in the product, which may lead to a deterioration of physical properties such as light resistance, tensile properties including tensile strength and abrasion resistance. In the case of the above-mentioned automobile interior and exterior components, these problems will not arise when all the ingredients are petroleum-derived, however, such ingredients inevitably generate carbon dioxide after disposal, and thus are not preferred from the viewpoint of eco-friendliness.

The present invention has been made in light of the above-mentioned situation. An object of the invention is to provide an interior material for a vehicle, having a skin layer which is obtained using a thermoplastic elastomer and a polylactic acid resin that is a plant-derived material, the skin layer being resistant to drawdown during forming, is not wrinkled, and has excellent light resistance, sufficient tensile properties and abrasion resistance in spite of the inclusion of a polylactic acid resin.

The present invention is as follows.

1. An interior material for a vehicle which comprises a skin layer and a base layer, wherein the skin layer comprises an olefin-based thermoplastic elastomer, a polyolefin resin, a polylactic acid resin and a styrene-based thermoplastic elastomer, and wherein contents of the olefin-based thermoplastic elastomer, the polyolefin resin, the polylactic acid resin and the styrene-based thermoplastic elastomer are respectively 20% to 70% by weight, 10% to 50% by weight, 5% to 30% by weight and 5% to 30% by weight based on 100% by weight of the total of the olefin-based thermoplastic elastomer, the polyolefin resin, the polylactic acid resin and the styrene-based thermoplastic elastomer.

2. The interior material for a vehicle according to 1 above, wherein the base layer comprises a natural fiber and a thermoplastic resin.

3. The interior material for a vehicle according to 2 above, wherein the thermoplastic resin is at least one resin selected from the group consisting of a polyolefin resin and a polylactic acid resin.

4. The interior material for a vehicle according to 2 above, wherein the thermoplastic resin is a polyolefin resin.

5. The interior material for a vehicle according to 2 above, wherein a crosslinked foam layer is provided between the skin layer and the base layer.

6. The interior material for a vehicle according to 5 above, wherein the crosslinked foam layer is formed using a polylactic acid resin.

7. The interior material for a vehicle according to 1 above, wherein the base layer comprises a polyurethane foam layer.

8. The interior material for a vehicle according to 7 above, wherein the polyurethane foam layer is obtained using a plant-derived material.

9. The interior material for a vehicle according to 7 or 8 above, wherein a support layer is provided on the polyurethane foam layer on the opposite side to the surface facing the skin layer.

The skin layer is provided in which a polylactic acid resin and a specific thermoplastic elastomer are uniformly mixed in the interior material for a vehicle of the present invention. Therefore, the interior material for a vehicle is wrinkle-free, and has excellent light resistance, tensile properties and abrasion resistance. In addition, owing to the use of the polylactic acid resin which is a plant-derived material, the skin layer imparts eco-friendliness to the interior material for a vehicle.

In the case where the base layer includes a natural fiber and a thermoplastic resin, the interior material for a vehicle is excellent in rigidity. The base layer having a natural fiber imparts eco-friendliness to the interior material for a vehicle.

In the case where a crosslinked foam layer is included between the skin layer and the base layer, the interior material for a vehicle is excellent in flexibility and has a smooth touch at the skin layer since the crosslinked foam layer is excellent in adhesiveness to a material of the skin layer and adhesiveness to a material of the base layer.

In the case where the base layer has a polyurethane foam layer, the polyurethane foam layer functions as a pad layer, and thus the interior material for a vehicle provides good cushioning properties and is suitable for a seat and the like.

Additionally, in the case where the polyurethane foam layer is obtained using a plant-derived material, the base layer is also formed using preferable materials and imparts eco-friendliness to the interior material for a vehicle.

Furthermore, in the case where the support layer is provided on the polyurethane foam layer on the opposite side to the surface facing the skin layer, the interior material for a vehicle is excellent in flexibility and rigidity.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIGS. 4(A)-4(D) are schematic explanatory view of a process for the production of the interior material for a vehicle shown in FIG. 1 by vacuum molding method while forming an embossed pattern on the skin layer during vacuum molding; and FIGS. 5(A)-5(D) are schematic explanatory view of a process for the production of the interior material for a vehicle shown in FIG. 2 by integral foam forming method.

DETAILED DESCRIPTION OF THE INVENTION

Figure 1:
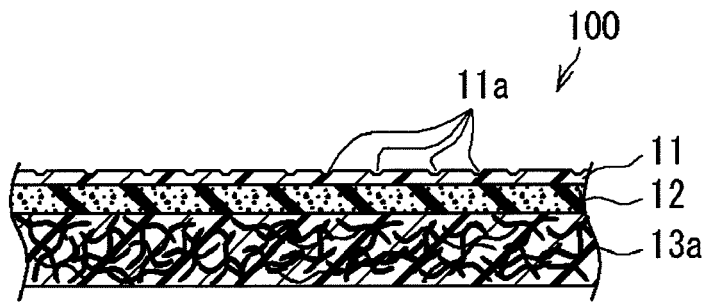
FIG. 1 is a schematic cross-sectional view of an interior material for a vehicle including a crosslinked foam layer.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

The interior material for a vehicle is one containing a skin layer and a base layer, the skin layer includes an olefin-based thermoplastic elastomer (hereinafter, referred to as "olefin-based thermoplastic elastomer (1)"), a polyolefin resin (hereinafter, referred to as "polyolefin resin (2)"), a polylactic acid resin (hereinafter, referred to as "polylactic acid resin (3)") and a styrene-based thermoplastic elastomer (hereinafter, referred to as "styrene-based thermoplastic elastomer (4)"), and contents of the olefin-based thermoplastic elastomer (1), the polyolefin resin (2), the polylactic acid resin (3) and the styrene-based thermoplastic elastomer (4) are respectively 20% to 70% by weight, 10% to 50% by weight, 5% to 30% by weight and 5% to 30% by weight based on 100% by weight of the total of the olefin-based thermoplastic elastomer (1), the polyolefin resin (2), the polylactic acid resin (3) and the styrene-based thermoplastic elastomer (4).

The skin layer is formed using an olefin-based thermoplastic elastomer (1), a polyolefin resin (2), a polylactic acid resin (3) and a styrene-based thermoplastic elastomer (4) as essential components. In the present invention, the skin layer is arranged such that it faces the automobile interior, and the outer surface of the skin layer functions as an artistic surface of the interior material for a vehicle.

The olefin-based thermoplastic elastomer (1) is not particularly limited and example thereof includes an olefin-based thermoplastic elastomer in which an olefin resin-based component as a hard segment contains a rubber component as a soft segment dispersed therein, and the like.

Examples of the olefin resin-based component include an olefin homopolymer, an olefin copolymer having an olefin unit in an amount of 70 mol % or more based on 100 mol % of the total of the constituting units, and the like. The copolymer may have two or more olefin units. Examples of the homopolymer include polyethylene, polypropylene and the like. Additionally, examples of the copolymer include ethylene propylene random copolymer, ethylene propylene block copolymer, ethylene vinyl acetate copolymer, ethylene alkyl acrylate copolymer, and the like. The olefin resin-based component may be used singly or in combination of two or more types thereof.

On the other hand, the rubber component is not particularly limited. Example thereof includes an olefin-based rubber, a styrene-based rubber, a urethane-based rubber, an acrylic-based rubber and the like. The rubber component may be used singly or in combination of two or more types thereof.

Examples of the olefin-based rubber include ethylene propylene copolymeric rubber (EPR), ethylene propylene non-conjugated diene copolymeric rubber (EPDM), ethylene 1-butene copolymeric rubber, ethylene 1-butene non-conjugated diene copolymeric rubber, ethylene propylene 1-butene copolymeric rubber, ethylene 1-hexene copolymeric rubber, ethylene vinyl acetate copolymeric rubber, ethylene alkyl acrylate copolymeric rubber, and the like. These copolymeric rubbers may be a random copolymeric rubber, a block opolymeric rubber, or a graft opolymeric rubber. Examples of the non-conjugated diene include 5-ethylidene-2-norbornene, 1,4-hexadiene, dicyclopentadiene, dicyclooctadiene, 1,2-butadiene and the like. The olefin-based rubber may be used singly or in combination of two or more types thereof.

The olefin-based rubber usually contains an olefin unit in an amount of 50 mol % or more based on 100 mol % of the total of the constituting units. The olefin-based rubber is preferably one containing no unit derived from an aromatic vinyl compound such as styrene. In the case where the olefin-based rubber contains a unit derived from an aromatic vinyl compound, the content thereof is 5 mol % or less.

The styrene-based rubber is a polymer containing a unit derived from an aromatic vinyl compound. Example thereof includes styrene butadiene styrene block copolymeric rubber, styrene isoprene styrene block copolymeric rubber, styrene ethylene butylene styrene block copolymeric rubber, styrene ethylene propylene styrene block copolymeric rubber, styrene butadiene random copolymeric rubber, styrene butadiene copolymeric rubber, and a hydrogenated polymer of these rubbers, and the like. The styrene-based rubber may be used singly or in combination of two or more types thereof.

The styrene-based rubber usually contains a unit derived from an aromatic vinyl compound in an amount of no less than 5 mol % based on 100 mol % of the total of the constituting units.

The olefin-based thermoplastic elastomer (1) is preferably an elastomer in which an olefin-based resin component contains an olefin-based rubber component dispersed therein. In this case, the olefin-based resin component is preferably at least one of polyethylene, polypropylene and an ethylene propylene copolymer. Particularly preferred is an ethylene propylene copolymer. Additionally, the olefin-based rubber component is preferably EPR and EPDM.

In the olefin-based thermoplastic elastomer (1), the olefin-based resin component and the olefin-based rubber component may be crosslinked. At least a portion of the olefin-based resin component is preferably crosslinked with the olefin-based rubber component. In the elastomer, the content of the olefin-based rubber component is preferably 90% or less by weight based on 100% by weight of the total of the olefin-based resin component and the olefin-based rubber component. When the content of the olefin-based rubber component is 90% or less by weight, the resin component and the rubber component can be blended easily.

The marketed product may be used as the olefin-based thermoplastic elastomer (1). Specific example thereof includes "Milastomer" manufactured by Mitsui Chemicals, Inc., "Tafmer" manufactured by Mitsui Chemicals, Inc., "Thermoran" manufactured by Mitsubishi Chemical Corp., "Zelas" manufactured by Mitsubishi Chemical Corp., "Espolex TPE" manufactured by Sumitomo Chemical Co., Ltd., "Tafcelen" manufactured by Sumitomo Chemical Co., Ltd., "Excelink" manufactured by JSR Corp., "Santoprene" manufactured by Exxon Mobile Corp., and the like.

The olefin-based thermoplastic elastomer (1) may be used singly or in combination of two or more types thereof.

The polyolefin resin (2) is not particularly limited and is a resin containing an olefin unit as an essential constituting unit. The polyolefin resin (2) has the olefin unit in an amount of 80 mol % or more based on 100 mol % of the total of the constituting units of the polyolefin resin (2). Examples of the olefin compound forming the olefin unit include ethylene, propylene, 1-butene, 1-pentene, 1-hexene, 2-methyl-1-propene, 3-methyl-1-pentene, 4-methyl-1-pentene, 5-methyl-1-hexene, and the like. The olefin compound may be used singly or in combination of two or more types thereof.

The constituting unit for the polyolefin resin (2) is preferably ethylene unit and propylene unit. The total content of ethylene unit and propylene unit is preferably 80 mol % or more, more preferably 85 mol % or more, and further preferably 90 mol % or more based on 100 mol % of the total of the constituting units of the polyolefin resin (2). The total content may be 100 mol %. That is to say, the polyolefin resin (2) may be polyethylene, polypropylene, or ethylene propylene copolymer. In the case where the polyolefin resin (2) has two or more olefin units, that is, the polyolefin resin (2) is a copolymer, the polymer may be a random copolymer such as ethylene propylene random copolymer, or a block copolymer such as ethylene propylene block copolymer.

The polylactic acid resin (3) is a resin containing a lactic acid unit and/or lactide unit (hereinafter, these units are referred to as "lactic acid units") as an essential constituting unit. Lactic acid may be L-lactic acid or D-lactic acid, and lactide may be L-lactide, D-lactide, meso-lactide, or DL-lactide. The lactic acid units constituting the polylactic acid resin (3) may be used singly or in combination of two or more types thereof. The content of the lactic acid units is not particularly limited and is preferably 70 mol % or more based on 100 mol % of the total of the constituting units of the polylactic acid resin (3). The content of the lactic acid units may be 100 mol %.

In the case where the polylactic acid resin (3) has other constituting unit besides lactic acid units, the content of the other constituting unit is usually 30 mol % or less and preferably 10 mol % or less based on 100 mol % of the total of the constituting units of the polylactic acid resin (3). The lower limit of the content is usually 1 mol %. Examples of the monomer forming the other constituting unit include a polycarboxylic acid such as oxalic acid, malonic acid and succinic acid, a polyhydric alcohol such as ethylene glycol and propylene glycol, a glycolide, a lactone such as $\epsilon$-caprolactone, and the like. The monomer may be used singly or in combination of two or more types thereof.

In the present invention, the polylactic acid resin (3) may be used in combination with other resin. The other resin is not particularly limited. Example thereof includes a polyester resin such as poly-$\epsilon$-caprolactone, poly-$\beta$-propiolactone, poly-$\beta$-butyrolactone, poly-$\gamma$-butyrolactone, polyglycolic acid, polymalic acid, polyethylene succinate, polybutylene succinate and butylene succinate adipate copolymer resin. The polyester resin may be used singly or in combination of two or more types thereof.

The styrene-based thermoplastic elastomer (4) is not particularly limited and is usually a copolymer having a constituting unit derived from an aromatic vinyl compound. The constituting unit is in the styrene-based thermoplastic elastomer (4) while forming an aromatic vinyl polymer blocks, and forms a hard segment.

The content of the constituting unit derived from an aromatic vinyl compound is usually in the range from 5 mol % to 80 mol % based on 100 mol % of the total of the constituting units of the styrene-based thermoplastic elastomer (4).

The aromatic vinyl compound is not particularly limited and example thereof include an alkyl substituted styrene such as styrene, $\alpha$-methyl styrene, o-methyl styrene, m-methyl styrene, p-methyl styrene and 1,3-dimethylstyrene, vinyl naphthalene, vinyl anthracene and the like. Among these, styrene is preferable as the aromatic vinyl compound. The aromatic vinyl compound may be used singly or in combination of two or more types thereof.

The other constituting part other than the aromatic vinyl polymer block, which forms a hard segment is not particularly limited so long as the part develops elastomer properties and functions as a soft segment. The part is usually formed using a conjugated diene. Examples of the conjugated diene include butadiene, isoprene, 1,3-pentadiene, 2,3-dimethyl-1,3-butadiene and the like. The conjugated diene may be used singly or in combination of two or more types thereof.

Examples of the styrene-based thermoplastic elastomer (4) include a hydrogenated elastomer and a non-hydrogenated elastomer. These elastomers may be used in combination. Examples of the hydrogenated styrene-based thermoplastic elastomer include a hydrogenated styrene butadiene copolymer such as hydrogenated styrene butadiene random copolymer, a hydrogenated styrene isoprene copolymer, hydrogenated styrene ethylene propylene styrene block copolymer, hydrogenated styrene ethylene butene styrene block copolymer and the like. On the other hand, examples of the non-hydrogenated styrene-based elastomer include a styrene butadiene copolymer such as styrene butadiene styrene block copolymer, a styrene isoprene copolymer such as styrene isoprene styrene block copolymer, and the like.

In the present invention, the styrene-based thermoplastic elastomer (4) is preferably a hydrogenated styrene-based thermoplastic elastomer.

The marketed product may be used as the styrene-based thermoplastic elastomer (4). Specific example thereof includes "Tuftec" (Tuftec H series and Tuftec P series) manufactured by Asahi Kasei Chemicals Corp., "Tufprene" manufactured by Asahi Kasei Chemicals Corp., "Asaprene" manufactured by Asahi Kasei Chemicals Corp., "Solprene" manufactured by Asahi Kasei Chemicals Corp., "Septon" manufactured by Kuraray Co., Ltd., "Hybrar" manufactured by Kuraray Co., Ltd., "Kraton G" manufactured by Kraton Performance Polymers Inc., "Dynaron" manufactured by JSR Corp., "JSR-TR" manufactured by JSR Corp., "JSR-SIS" manufactured by JSR Corp., "Espolex SB" by manufactured by Sumitomo Chemical Co., Ltd., "Rabalon" manufactured by Mitsubishi Chemical Corp., "Denka STR" manufactured by DENKI KAGAKU KOGYO KABUSHIKI KAISHA, "Quintac" manufactured by Zeon Corp., "Leostomer" manufactured by Riken Technos Corp., and the like.

The styrene-based thermoplastic elastomer (4) may be used singly or in combination of two or more types thereof.

The skin layer may contain other component besides the above-mentioned elastomer and resin. The content of the other component is usually 10 parts or less by weight based on 100 parts by weight of the total amount of the above-mentioned elastomer and resin.

Examples of the other component include an antioxidant such as a phenol-based compound and a phosphorus-based compound, a light stabilizer such as a hindered amine compound, a ultraviolet absorber such as a benzotriazole compound, a lubricant such as a stearic acid compound, an antistatic agent, a softener such as mineral oil and process oil, a plasticizer, a pigment, a filler such as talc, a flame retardant, a flame retardant auxiliary agent, an antibacterial agent, a deodorant, and the like. The other component may be used singly or in combination of two or more types thereof.

As described above, the skin layer contains an olefin-based thermoplastic elastomer (1), a polyolefin resin (2), a polylactic acid resin (3) and a styrene-based thermoplastic elastomer (4). When the total of the olefin-based thermoplastic elastomer (1), the polyolefin resin (2), the polylactic acid resin (3) and the styrene-based thermoplastic elastomer (4) is 100% by weight, contents of the olefin-based thermoplastic elastomer (1), the polyolefin resin (2), the polylactic acid resin (3) and the styrene-based thermoplastic elastomer (4) are respectively 20% to 70% by weight, 10% to 50% by weight, 5% to 30% by weight and 5% to 30% by weight. The preferable contents of the olefin-based thermoplastic elastomer (1), the polyolefin resin (2), the polylactic acid resin (3) and the styrene-based thermoplastic elastomer (4) are respectively 35% to 65% by weight, 15% to 45% by weight, 5% to 20% by weight and 5% to 20% by weight. The more preferable contents of the olefin-based thermoplastic elastomer (1), the polyolefin resin (2), the polylactic acid resin (3) and the styrene-based thermoplastic elastomer (4) are respectively 40% to 60% by weight, 20% to 40% by weight, 5% to 15% by weight and 5% to 15% by weight.

When the contents of the olefin-based thermoplastic elastomer (1), the polyolefin resin (2), the polylactic acid resin (3) and the styrene-based thermoplastic elastomer (4) are respectively 20% to 70% by weight, 10% to 50% by weight, 5% to 30% by weight and 5% to 30% by weight, the styrene thermoplastic elastomer (4) successfully functions as a compatibilizer and allows uniform mixing with other three elastomer and resins, which are usually hard to be uniformly mixed. In addition, generation of wrinkle on the skin layer can be suppressed and deterioration of physical properties including light resistance, tensile properties, abrasion resistance and the like can be prevented. Furthermore, the use of the polylactic acid resin (3) is preferred from the viewpoint of eco-friendliness, because it reduces the usage of petroleum-derived materials.

The thickness of the skin layer is not particularly limited and may be in the range from 0.2 to 1.5 mm. When the thickness of the skin layer is from 0.2 to 1.5 mm, strength of the skin layer is sufficient, being favorable. Additionally, the skin layer has high resistance against scratch and stabbing, and imparts favorable properties to the interior material for a vehicle. The thickness of the skin layer is preferably from 0.3 to 1.4 mm, and particularly from 0.4 to 1.3 mm.

Regarding the hardness of the skin layer, Shore A hardness is preferably in the range from 70 to 90. When the Shore A hardness is from 70 to 90, strength of the skin layer is sufficient, being favorable. Additionally, the skin layer has high resistance against scratch and stabbing, and imparts favorable properties to the interior material for a vehicle. The Shore A hardness of the skin layer is preferably from 75 to 85, and particularly from 77 to 83.

Figure 2:
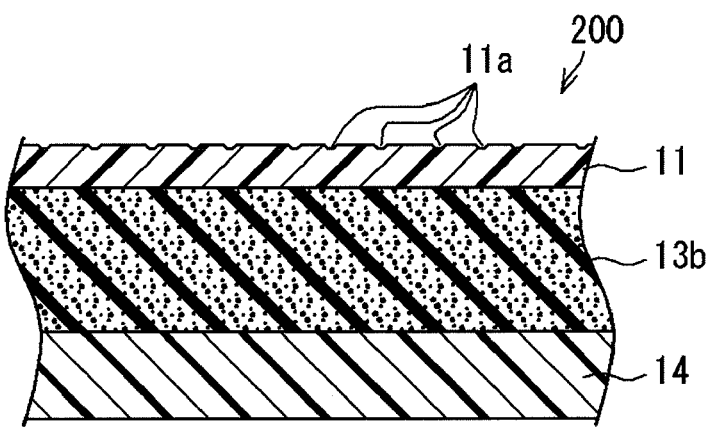
FIG. 2 is a schematic cross-sectional view of another interior material for a vehicle in which a base layer is a polyurethane foam layer and the interior material has a support layer.

The skin layer may have a concave-convex surface (see the embossed pattern indicated with reference numeral 11a in FIGS. 1 and 2) on the outer surface (the surface to be an artistic surface of the interior material for a vehicle). Examples of the concave-convex pattern include embossed pattern, satin pattern, hairline pattern and the like. The number of types of the concave-convex pattern is not particularly limited. Only one type of the concave-convex pattern may be provided. Two or more types may be provided. The concave-convex pattern may be formed by clamping the skin layer forming material to a roll having a concave-convex pattern on its circumference surface, thereby transferring the concave-convex pattern. Alternatively, a die forming process may be used, wherein one surface of the heated skin layer forming material is pressed to a die having a concave-convex pattern, thereby transferring the concave-convex pattern. The skin layer having a concave-convex pattern leads to an aesthetic and artistic surface due to the decorative effect. In addition, such skin layer offers a smooth touch and a higher rub resistance.

The base layer is a substrate of the interior material for a vehicle. The material of the base layer is not particularly limited so long as it has sufficient rigidity. The base layer is preferably a base layer containing a thermoplastic resin, and a base layer obtained using a polyurethane foam.

The thermoplastic resin constituting the base layer is not particularly limited. Example thereof includes a polyolefin resin, a polyester resin, a polystyrene-based resin, a polyacrylic resin, a polyamide resin, a polycarbonate resin, a polyacetal resin, an ABS resin such as acrylonitrile butadiene styrene copolymeric resin, an MBS resin such as methyl methacrylate butadiene styrene copolymeric resin, and the like. Among these thermoplastic resin, polyolefin resin and polyester resin are preferable. The thermoplastic resin may be used singly or in combination of two or more types thereof.

The polyolefin resin is not particularly limited and may be the same as the exemplified resin in the description on the polyolefin resin (2) for the formation of the skin layer. The polyolefin resin may be used singly or in combination of two or more types thereof. In the present invention, a polyolefin resin having an ethylene unit and/or a propylene unit is preferable, and a polyolefin resin in which the total content of the ethylene unit and propylene unit is preferably 80 mol % or more, and more preferably 90 mol % or more is particularly preferred. The total content may be 100 mol %. That is to say, the polyolefin resin may be a polyethylene, polypropylene, ethylene propylene random copolymer, or ethylene propylene block copolymer. The polyolefin resin constituting the base layer may be the same as or different from the polyolefin resin (2) used for the formation of the skin layer.

The polyester resin is not particularly limited. Example thereof includes an aromatic polyester resin, an aliphatic polyester resin, and the like. The polyester resin may be used singly or in combination of two or more types thereof.

Examples of the polyester resin include polyethylene terephthalate, polytrimethylene terephthalate, polybutylene terephthalate, and the like. In addition, examples of the aliphatic polyester resin include a polylactic acid resin and the like. The starting material of the polylactic acid resin is a natural material, being favorable from the viewpoint of environment. When the polylactic acid resin is used, a base layer can be obtained having excellent mechanical properties, durability and the like. The polylactic acid resin may be the same as the exemplified resin in the description on the polylactic acid resin (3) for the formation of the skin layer.

The base layer may include, besides the thermoplastic resin, a natural material such as a natural fiber and a non-fibrous plant material. The natural material may be used singly or in combination of two or more types thereof. Examples of the natural fiber include a plant fiber, a protein fiber such as an animal fiber and a silk fiber, and the like. Examples of the non-fibrous plant material include a material obtained by subdividing woody moieties of a plant, such as a woody-moiety-crushed product or a woody-moiety-pulverized product. More specifically, the non-fibrous plant material may be a kenaf core, woody flour, and the like.

In the present invention, a natural fiber is preferable and a plant fiber is particularly preferred.

Examples of the plant fiber include ones obtained by a plant such as kenaf, jute hemp, manila hemp, sisal hemp, gampi, Mitsumata, Kozo, banana, pineapple, coconut, corn, sugarcane, bagasse, palm, papyrus, reed grass, esparto, Sabi grass, oat, rice plant, bamboo, various conifer trees (Japanese cedar, Japanese cypress, and others), broad leaf tree and cotton. The plant fiber may be used singly or in combination of two or more types thereof.

The moiety of a plant that is used for the plant fiber is not particularly limited, but may be any moiety that constitutes the plant as far as the fiber can be collected therefrom. Only a specified moiety may be used, or two or more different moieties may be used in combination. Fibers collected from the individual moieties are a bast fiber (derived from kenaf, roselle, *Cannabis Sativa*, flax, ramie, jute, hemp and the like), a seed hair fiber (derived from cotton and the like), a leaf vein fiber (derived from Manila hemp, sisal hemp and the like), a fruit fiber (derived from coconut and the like), and the like.

Kenaf is particularly preferred as a plant having a plant fiber since it is a very fast growing annual grass and has excellent absorbtity of carbon dioxide so that it can contribute to reducing an amount of carbon dioxide in the air, thus effectively utilizing forest resources and others. The tough skin of kenaf contains cellulose components in a proportion of 60% or more by weight; thus, kenaf fiber collected from the tough skin of the kenaf is particularly preferred as a plant fiber. Kenaf is an early growing annual plant having a woody stem and is classified into malvaceae. The kenaf includes *hibiscus cannabinus* and *hibiscus sabdariffa* of scientific names, and further includes Indian hemp, Cuban kenaf, kenaf, roselle, mesta, bimli hemp, ambary hemp, Bombay hemp and the like of common names.

The average fiber length and the average fiber diameter of the natural fiber such as a plant fiber are not particularly limited. The average fiber length is preferably 10 mm or longer. The plant fiber having the average fiber length of 10 mm or longer leads to a base layer having excellent mechanical properties. The average fiber length is more preferably in the range from 10 to 150 mm, further preferably from 20 to 100 mm, and particularly from 30 to 80 mm. The average fiber length is the average of values obtained by taking out monofilaments one by one at random from the fiber, keeping the taken-out monofilaments straightly without extending the monofilaments, and measuring the lengths of the total 200 of the monofilaments on a spread-flat measure by the direct method in accordance with JIS L 1015. On the other hand, the average fiber diameter is preferably 1 mm or shorter. The plant fiber having the average fiber diameter of 1 mm or shorter leads to a base layer having excellent mechanical properties. The average fiber diameter is more preferably in the range from 0.01 to 1 mm, further preferably from 0.05 to 0.7 mm, and particularly from 0.07 to 0.5 mm. The average fiber diameter is the average of values obtained by taking out monofilaments one by one at random from the fiber, and using an optical microscope to measure actually the fiber diameter at the center in the length direction of each of the total 200 of the monofilaments.

The natural fiber and non-fibrous plant material may each be pretreated with a coupling agent having a reactive functional group, or the like in order to improve in the affinity with the thermoplastic resin used together, and others. Examples of the coupling agent include an isocyanate based compound, an organic silane based compound, an organic titanate based compound and the like.

When a thermoplastic resin and a natural fiber are used together for the base layer, the content of the thermoplastic resin is preferably in the range from 5% to 90% by weight, more preferably from 10% to 80% by weight, and further preferably from 20% to 70% by weight based on 100% by weight of the total of the thermoplastic resin and the natural fiber. In the case where the thermoplastic resin is a polyolefin resin such as polypropylene resin and the natural fiber is a plant fiber such as kenaf fiber, the content of the polyolefin resin (polypropylene resin) is preferably in the range from 10% to 90% by weight, more preferably from 20% to 80% by weight, and particularly from 30% to 70% by weight based on 100% by weight of the total of the polyolefin resin (polypropylene resin) and the natural fiber (kenaf fiber).

The thickness of the base layer is not particularly limited, and is preferably 10 mm or less. When the thickness of the base layer is 10 mm or less, the base layer can support sufficiently other layer such as skin layer and leads to a strength sufficient for being used in an interior material for a vehicle. The thickness thereof is more preferably in the range from 0.1 to 5.0 mm, and further preferably from 1.0 to 3.0 mm.

The base layer may have a polyurethane foam layer. Since a polyurethane foam has usually flexibility and excellent cushioning characteristics, the polyurethane foam is suitable as a constitutional material for a seat among the interior material for a vehicle. Thus, the polyurethane foam layer functions as a pad material for a seat of an automobile. A base layer having the polyurethane foam layer usually makes up the interior material for a vehicle of the present invention while having a support layer described later.

The polyurethane foam layer is formed using a raw material for a foam, which includes a polyol, a polyisocyanate, a crosslinker, a catalyst, a blowing agent, a foam control agent and the like.

When the polyurethane foam layer is used as a base layer in the present invention, the interior material for a vehicle has a skin layer 11, a base layer 13b, and a support layer 14 which supports the base layer 13b, sequentially (see, FIG. 2). In this embodiment, a part for the support layer obtained using a metal or a synthetic resin is usually attached to the base layer consisting of a polyurethane foam on the opposite side to the surface facing the skin layer. The shape of the support layer (the part for the support layer) is not particularly limited and has ordinarily a frame-like, or plate-like form depending upon the surface form of the polyurethane foam. When the surface of the polyurethane foam layer has concavity and convexity, or is curved, the shape of the support layer (the part for the support layer) may be selected according to the shape of the polyurethane foam layer. The constitutional material of the part for the support layer may be a metal, a synthetic resin, or the like. Examples of the metal include iron, aluminium, magnesium and the like. Among these, iron is preferable from the view point of strength and moldability. In addition, examples of the synthetic resin include a thermoplastic resin such as polypropylene and ABS resin. Further, a composite material containing a metal and a synthetic resin may be used as the part for the support layer.

The thickness of the support layer is not particularly limited, and is preferably in the range from 0.5 to 5.0 mm, and particularly from 0.8 to 3.0 mm.

The interior material for a vehicle 200 shown in FIG. 2 is suitable as a constitutional part including a seat, instrument panel, console box, arm rest and the like.

When the base layer contains a natural fiber and a thermoplastic resin, the interior material for a vehicle of the present invention is an interior material for a vehicle 100 having a crosslinked foam layer between the skin layer 11 and base layer 13a, shown in FIG. 1.

The material constituting the crosslinked foam layer is not particularly limited. Examples of the material include a crosslinked using a polyolefin resin or the like, and a crosslinked using a polylactic acid resin or the like.

The polyolefin resin may be the same as the exemplified resin in the description on the polyolefin resin (2) for the formation of the skin layer. The preferable polyolefin resin is a polypropylene resin, polyethylene resin, ethylene propylene random copolymeric resin, and ethylene propylene block copolymeric resin. Among these, polypropylene resin is preferred.

The polylactic acid resin may be the same as the exemplified resin in the description on the polylactic acid resin (3) for the formation of the skin layer.

The other resin may be an aliphatic polyester resin such as polyethylene succinate, polybutylene succinate, and butylene succinate adipate copolymer.

In the present invention, a crosslinked foam obtained using a polylactic acid resin and an aliphatic polyester resin except the polylactic acid resin in combination.

The thickness of the crosslinked foam layer is not particularly limited and is preferably in the range from 0.5 to 3.0 mm, more preferably from 0.5 to 2.0 mm, and further preferably from 0.7 to 1.5 mm. When the thickness is from 0.5 to 3.0 mm, mechanical properties of the crosslinked foam layer are sufficient. Additionally, the crosslinked foam layer having such thickness is suitable as a constitutional part of the interior material for a vehicle since the crosslinked foam layer has high resistance against stabbing.

When the crosslinked foam is used, more excellent heat resistance, moldability and the like can be obtained than a non-crosslinked foam in the interior material for a vehicle of the present invention.

The production method of the interior material for a vehicle of the present invention is not particularly limited and is usually selected according to the types of a material for forming the base layer. The interior material for a vehicle shown in FIG. 1 and the interior material for a vehicle shown in FIG. 2 can be produced as follows.

In the following description, the material for forming the skin layer is preferably a sheet. The sheet may be produced by forming with an extruder equipped with a T die, or calendaring. Additionally, the sheet-form material for forming the skin layer may be subjected to, as necessary, uniaxial or biaxial stretching to improve the tensile strength and other properties. The material for forming the skin layer is a composition containing the above-mentioned olefin-based thermoplastic elastomer (1), polyolefin resin (2), polylactic acid resin (3) and styrene-based thermoplastic elastomer (4) in specific amounts. The material is also a composition in which the polylactic acid resin (3) is uniformly dispersed that is not easy to uniformly mix with the thermoplastic elastomer and the like. When the sheet of the composition is used, a skin layer having light resistance can be obtained without wrinkling.

At first, the interior material for a vehicle 100 shown in FIG. 1 is one in which a crosslinked foam layer 12 is disposed between a forming material of the skin layer 11 and a forming material of the base layer 13a, while bonding each other. A concave-convex pattern 11a (including embossed pattern) may be formed on the surface of the skin layer 11 which is to be an artistic surface of the interior material for a vehicle 100.

Specifically, the interior material for a vehicle 100 can be produced by joining a material for forming the skin layer 111 and a crosslinked foam sheet 121 to form a double-layered sheet 30, and subjecting the double-layered sheet 30 and a material for forming the base layer 131 to molding method such as vacuum molding to integrate.

The forming method of the double-layered sheet 30 includes: (1) a method in which a material for forming the skin layer 111 in sheet-form and a crosslinked foam sheet 121 are joined using an adhesive agent such as urethane-based adhesive agent and vinyl acetate emulsion-based adhesive agent; (2) a method in which a material for forming the skin layer 111 in sheet-form and a crosslinked foam sheet 121 are joined using an adhesive resin film; (3) a method in which surface(s) of at least one of a material for forming the skin layer 111 in sheet-form and a crosslinked foam sheet 121 is (are) heated and two sheets are joined at heated surface while pressing; (4) a method in which a melting product of the material for forming the skin layer is extruded onto a surface of the crosslinked foam sheet 121 using an extruder or the like to join; and the like.

The double-layered sheet 30 may be produced by other method.

The crosslinked foam sheet 121 is preferably a sheet consisting of a foam made of a crosslinked resin. The preferable sheet is one obtained by crosslinking and blowing a crosslinkable foamable resin composition containing the above-mentioned resin such as polyolefin resin and polylactic acid resin, a crosslinking aid and a blowing agent.

The crosslinking aid is usually used for the purpose of crosslinking a resin which is usually hard to be crosslinked. In particular, it is effective for a polypropylene resin and a polylactic acid resin. A polyethylene resin is readily being crosslinked with no addition of a crosslinking aid. The crosslinking aid is usually a multifunctional monomer having at least two functional groups in its molecule.

Examples of the crosslinking aid include divinylbenzene, 1,6-hexanediol dimethacrylate, ethyleneglycol dimethacrylate, trimethylolpropane trimethacrylate, triallyl cyanurate, triallyl isocyanurate, N-phenyl maleimide, N,N'-m-phenylene bismaleimide, and the like. The crosslinking aid may be used singly or in combination of two or more types thereof. Among these, divinylbenzene, 1,6-hexanediol dimethacrylate and trimethylolpropane trimethacrylate are preferable.

The content of the crosslinking aid in the crosslinkable foamable resin composition is preferably in the range from 1 to 7 parts by weight, and particularly from 3 to 5 pats by weight, based on 100 parts by weight of the resin to be used. When the content of the crosslinking aid is from 1 to 10 parts by weight, crosslinking is efficiently achieved.

The blowing agent is not particularly limited and is preferably a pyrolytic blowing agent. Particularly preferred is an organic pyrolytic blowing agent. Examples of the organic pyrolytic blowing agent include azodicarbonamide, benzenesulfonyl hydrazide, N,N'-dinitrosopentamethylenetetramine, toluenesulfonyl hydrazide, azobisisobutyronitrile, and the like. The blowing agent may be used singly or in combination of two or more types thereof.

The content of the blowing agent in the crosslinkable foamable resin composition is usually in the range from 1 to 50 parts by weight, and particularly from 1 to 25 parts by weight, based on 100 parts by weight of the total of the resin and crosslinking aid. When the content of the blowing agent is from 1 to 50 parts, the composition is easily foamed to form a crosslinked foam having excellent mechanical properties and heat resistance.

The crosslinkable foamable resin composition may contain a decomposition temperature regulator, a terminal blocking agent such as a multifunctional carbodiimide compound and a multifunctional epoxy compound, an organic peroxide such as dicumyl peroxide, a biodegradation accelerator, a blowing agent decomposition accelerator, an antiblocking agent, a thickener, a foam stabilizer, an antioxidant, a light stabilizer, a ultraviolet absorber, a lubricants, an antistatic agent, a softener, a plasticizer, a pigment, a filler, a flame retardant, a flame retardant auxiliary agent, an antibacterial agent, a deodorant, and the like. The additive may be used singly or in combination of two or more types thereof.

The preparation method of the crosslinkable foamable resin composition is not particularly limited. The composition is usually prepared by mixing a blowing agent and a resin composition containing a resin and a crosslinking aid, and melt-kneading the mixture at a temperature lower than the decomposition temperature (blowing temperature) of the blowing agent using a kneader such as an extruder, Banbury mixer, a kneader mixer and a mixing roll. After the melt-kneading operation, the crosslinkable foamable resin composition is subjected to formation into, for example, a sheet.

Subsequently, the crosslinkable foamable resin composition in sheet form is subjected to crosslinking reaction and blowing reaction. The crosslinking method is not particularly limited. Crosslinking may be achieved by ionizing radiation or chemical crosslinking using an organic peroxide. These methods may be combined. Among these, the ionizing radiation is preferred. Examples of the ionizing radiation include electron beams, X ray, β-ray and γ-ray. The dose of ionizing radiation is preferably in the range from 1 to 200 kGy, and particularly from 1 to 100 kGy. Through the ionizing radiation, the sheet-form composition is crosslinked, followed by heating at a temperature equal to or higher than the decomposition temperature of the blowing agent, thereby forming a crosslinked foam sheet 121.

The blowing method may be selected according to the types of the blowing agent, and the like. When a pyrolytic blowing agent is used as the blowing agent, the crosslinkable foamable resin composition or a foamable resin molded body which is formed and crosslinked, is heated to a temperature equal to or higher than the decomposition temperature of the blowing agent and the melting point of the resin having the highest melting point (for example, 190° C. to 290° C.) to produce a foamed body. The heating method is not particularly limited and example thereof includes a method using hot air, infrared ray, or an oil bath. The method may be used singly or in combination of two or more types thereof.

Examples of the fabricating method of the material for forming the base layer 131 in sheet-form include: (a) a method in which thermoplastic resin fibers and natural fibers are fiber-mixed by air-laid method to form a fiber mat, and the fiber mat is pressed while heating; (b) a method in which a dispersion such as an emulsion and a suspension that contain a thermoplastic resin dispersed in a medium is sprayed over natural fibers, resin-impregnated fibers are heated and dried, resin containing fibers are subjected to air-laid method, and a resin containing fiber mat are pressed while heating; (c) a method in which a non-woven fabric made of natural fibers are dipped in a dispersion such as an emulsion or suspension containing a thermoplastic resin dispersed in a medium, and dried to form a resin-impregnated non-woven fabric mat, and the resin-impregnated non-woven fabric mat is pressed while heating; and the like.

Of these methods (a) to (c), the methods (b) and (c) allows more uniform mixing of the natural fibers with the thermoplastic resin contained in the fiber mat, being favorable. The method (a) is suitable for mass production, because it allows simplification of the process, reduction of the production cost, and offers high productivity, being favorable. Among these methods, the method (a) suitable for mass production is more preferred due to its productivity.

In the method (a), fiber-mixing method of thermoplastic resin fiber with natural fibers is not particularly limited. Example thereof includes, fleecing method and carding method in addition to air-laid method. The fiber-mixing method may be performed singly or in combination of two or more. After fiber-mixing, the fibers may be entangled by, for example, a needle punch method or a stitch bonding method. The entangling method may be performed singly or in combination of two or more. The conditions for pressing the fiber mat while heating depend on the types of the thermoplastic resin fibers and the like. For example, temperature is in the range from 170° C. to 240° C., and pressure is in the range from 1 to 2 MPa.

Obtained double-layered sheet 30 and material for forming the base layer 131 in sheet-form are subjected to vacuum molding to produce an interior material for a vehicle 100. Specific examples of the vacuum molding method include: a method in which a heated double-layered sheet 30 is attached to a material for forming the base layer 131 in predetermined shape while vacuuming to integrate (see FIG. 3(A)-3(C)); a method in which a double-layered sheet 30 in predetermined shape and a material for forming the base layer 131 in predetermined shape are subjected to vacuum molding to integrate (see FIG. 4(A)-3(D)); and the like. In the vacuum molding method, a drape vacuum forming method, a cavity vacuum forming method, a combination of these vacuum forming methods, a method of plug assist forming concurrently with drape vacuum forming, and a method of vacuum forming concurrently with pressing with upper and lower dies are applied.

As described above, the skin layer may have a concave-convex pattern on one surface to be the artistic surface of the interior material for a vehicle. The concave-convex pattern may be formed at any time. The concave-convex pattern can be formed, for example, (1) during the production of the material for forming a skin layer 111, (2) during the production of the double-layered sheet 30, or (3) during vacuum forming for the production of an interior material for a vehicle.

Figure 3:
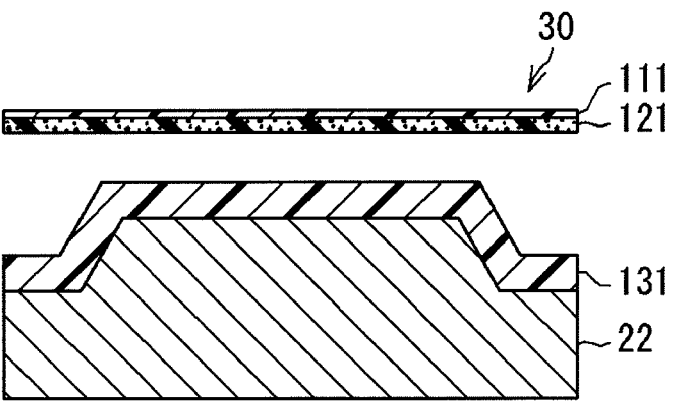
FIGS. 3(A)-3(C) are schematic explanatory view of a process for the production of the interior material for a vehicle shown in FIG. 1 by vacuum molding method.

The production method is described in detail using FIGS. 3 and 4.

Figure 3B:
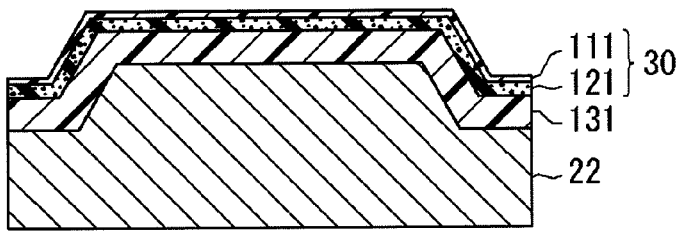
Figure 3C:
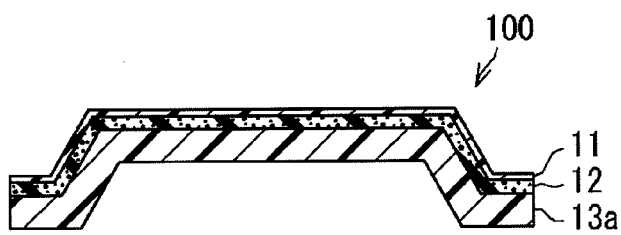

The vacuum molding method shown in FIG. 3 is one in which a material for forming a base layer 131 is mounted on a die 22, a softened double-layered sheet 30 by heating at a temperature of, for example, 120° C. to 160° C. is set to the material 131 (see, FIG. 3(A)), these components are sucked toward the die 22 (see, FIG. 3(B)), and then, the integrated interior material for a vehicle 100 shown in FIG. 3(C) is released. In this case, the material for forming a base layer 131 may have an adhesive on its surface in advance.

Figure 4A:
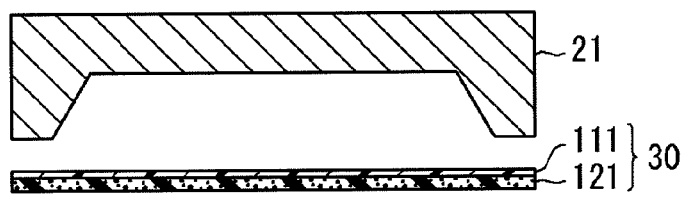
Figure 4B:
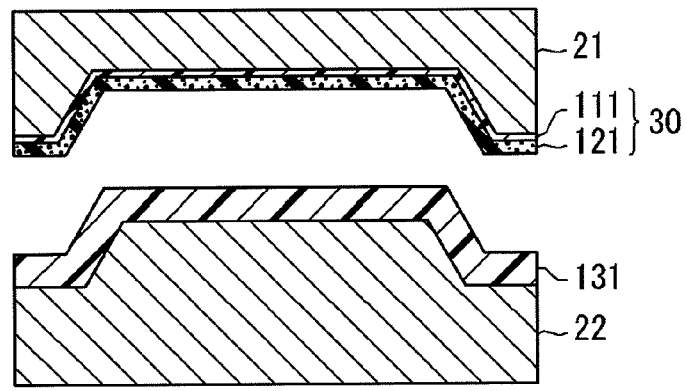

The vacuum molding method shown in FIG. 4 is one in which a double-layered sheet 30 is sucked toward an upper die 21 from the side of a material for forming a skin layer 111 (see, FIG. 4(A)), a material for forming a base layer 131 is mounted on a lower die 22 (see, FIG. 4 (B)), the upper die 21 and the lower die 22 are clamped while sucking from, for example, the side of the lower die 22 to integrate the double-layered sheet 30 and the material for forming a base layer 131 (see, FIG. 4(C)), and then the integrated interior material for a vehicle 100 shown in FIG. 4(D) is released. In this case, the material for forming a base layer 131 may have an adhesive on its surface in advance.

In the case of the vacuum molding method shown in FIG. 4, when the interior material for a vehicle 100 is released, (1) sucking toward the upper die 21 and the lower die 22 may be stopped, or (2) sucking toward the upper die 21 is stopped, while sucking toward the lower die 22 is maintained. In particular, when the material for forming a base layer 131 is poromeric, conformability of the double-layered sheet 30 to the die shape is improved by the method (2), and thus the double-layered sheet 30 can be more firmly bonded to the material for forming a base layer 131.

The poromeric material for forming a base layer 131 may be prepared by forming through holes according to the known method. In the case of using a material for forming a base layer containing natural fibers, when the content of the thermoplastic resin is 70% or less by weight based on 100% by weight of the total of the thermoplastic resin and natural fibers, air permeability suitable for vacuum molding can be obtained.

In the case of the vacuum molding method shown in FIG. 4, when the concave-convex pattern is formed on the inner surface of the upper die 21, the concave-convex pattern can be transferred to the material for forming a skin layer 111. The transfer of the concave-convex pattern may be achieved at any time. For example, when the upper die 21 is a hot die, the double-layered sheet 30 is attached to the upper die 21 while sucking to transfer the concave-convex pattern. Alternatively, the concave-convex pattern may be transferred during clamping to the lower die 22. Before the transfer of the concave-convex pattern, the side of the material for forming the skin layer 111 to be the artistic surface of the skin layer is preferably preheated to a temperature of 120° C. or higher. As a result of this, the skin layer has a markedly sharp concave-convex pattern. The temperature of preheating is preferably in the range from 140° C. to 220° C., and particularly from 160° C. to 200° C.

Furthermore, in the case of the vacuum molding methods shown in FIGS. 3 and 4, when the material for forming a base layer 131 is not preformed, the material 131 is heated to soften, and is mounted on the die 22 to be sucked toward the die 22. In this case, the double-layered sheet 30 is preferably preheated. The preheating can prevent the double-layered sheet 30 from partial elongation and make the sheet 30 follow to complicated shapes. The preheating temperature of the sheet 30 is not particularly limited, and is appropriately adjusted according to the types and thickness of the material for forming the skin layer 111, and to the types and thickness of the crosslinked foam sheet 121. The material for forming the skin layer 111 is heated so that the temperature of the side of the material 111 to be the artistic surface of the skin layer is preferably in the range from 120° C. to 220° C., more preferably from 140° C. to 220° C., and further preferably from 160° C. to 200° C. When the heating temperature is in the range from 120° C. to 220° C., the material for forming the base layer 131 and the crosslinked foam sheet 121 in the double-layered sheet 30 can be firmly bonded together during vacuum molding, and the interior material for a vehicle 100 can be obtained having excellent appearance.

Next, the interior material for a vehicle 200 shown in FIG. 2 can be produced by joining a material for forming a skin layer, a material for forming a base layer, consisting of a polyurethane foam obtained using a raw material for a foam containing a polyol, polyisocyanate, crosslinker, catalyst, blowing agent, foam control agent and the like that are described later, and a material for forming a support layer. For example, there is a method in which a material for forming the skin layer in sheet-form 111 and a plate-like polyurethane foam are used to form a composite material having the skin layer 11 and base layer 13b, and a forming material for the support layer 14 (hereinafter, referred to as "support plate 141") is joined to the surface of the base layer 13b. The production method of the plate-like polyurethane foam is not particularly limited. Example thereof includes a method in which a raw material for a foam is charged into a die using at least one mixing head, and is subjected to reaction at a temperature ranging from normal temperature to about 70° C. The die is preferably one in which inner surface is coated with a release agent.

Alternately, the interior material for a vehicle 200 can be produced by an integral foam forming method in which a raw material for a foam is injected into a die space between a support plate 141 and a material for forming the skin layer 111 to be a skin layer 11, the raw material is subjected to reaction at a temperature ranging from normal temperature to about 70° C. for curing, the material for forming the skin layer 111, the material for forming the base layer 13b consisting of a polyurethane foam and the support plate 141 are all integrated. In this case, when the support plate 141 has a sufficient strength, consists of a metal or synthetic resin, and is easy to handle, the interior material for a vehicle 200 can be produced at ease.

The raw material for a foam is used on a condition of isocyanate index of preferably from 70 to 140, and particularly from 80 to 120.

The integral foam forming method shown in FIG. 5 is described.

The method is one in which a material for forming a skin layer 111 is sucked toward a lower die 32, a support plate 141 is mounted between the upper die 31 and the material for forming a skin layer 111 on the lower die 32, the upper die 31 and lower die 32 are clamped (see, FIG. 5(B)), a raw material for a foam is injected from a raw material inlet 16 provided on the upper die 31, and the raw material for a foam is subjected to reaction to form a polyurethane foam 15 (see, FIG. 5(C)) and integrate the material for forming the skin layer 111, the polyurethane foam 15, and support plate 141, and then, the integrated interior material for a vehicle 200 shown in FIG. 5(D) is released.

In the case of the integral foam forming method shown in FIG. 5, when the interior material for a vehicle 200 is released, sucking toward the lower die 32 may be stopped or continued during die removal. In particular, when the polyurethane foam 15 contains open-cell foam and thus has sufficient air permeability, sucking may be continued thereby achieving high followability of the material for forming the skin layer 111 to the inner shape of the lower die 32, and the material for forming the skin layer 111 and the polyurethane foam 15 can be more firmly bonded together. Furthermore, in the integral foam forming method, when the inner surface of the lower die 32 has a concave-convex pattern, the concave-convex pattern can be transferred to the material for forming the skin layer 111. The transfer of the concave-convex pattern may be achieved at any time. For example, the concave-convex pattern is transferred during adsorption of the material for forming the skin layer 111 to the heated lower die 32. Alternatively, the lower die 32 is heated during clamping to the upper die 31, thereby transferring the concave-convex pattern. Before the transfer of the concave-convex pattern, the side of the material for forming the skin layer 111 to be the artistic surface of the skin layer is preferably preheated at a temperature of 60° C. or higher. As a result of this, the skin layer has a markedly sharp concave-convex pattern. The temperature of preheating is preferably in the range from 60° C. to 140° C., and particularly from 80° C. to 120° C.

Hereinafter, a raw material for a foam is described which is used for the formation of the polyurethane foam layer.

The polyol is not particularly limited and widely known polyol for the formation of a polyurethane foam can be used. Example thereof include a polyether polyol, a polyester polyol, a polymer polyol, a polycarbonate polyol, poly(meth) acryl polyol and the like. In, addition, a plant-derived castor oil polyol can be used. The polyol may be used singly or in combination of two or more types thereof. The use of the castor oil polyol is preferred from the viewpoint of eco-friendliness. When other polyol except the castor oil polyol is used, a polyol having an average functional group number of 2.0 to 6.0, and a hydroxyl value of 20 to 800 mg KOH/g is preferably used. The use of such polyol leads to a polyurethane foam layer having excellent elongation with a suppressed compression residual strain.

Other polyol is preferably a polyether polyol and a polymer polyol.

Examples of the polyether polyol include polyoxyethylene polyol, polyoxypropylene polyol and polyoxyethylene polyoxypropylene polyol that are produced by addition polymerization of, for example, ethylene oxide (hereinafter, referred to as "EO") and propylene oxide (hereinafter, referred to as "PO") with an initiator such as a low molecular weight alcohol, an amine, an amino alcohol, and a phenol compound. The polyether polyol is preferably polyoxyethylene polyoxypropylene polyol, and the polyoxyethylene polyoxypropylene polyol preferably contains a polyol produced by block addition polymerization of PO and EO, and a polyoxyethylene polyoxypropylene polyol having an oxyethylene unit with EO terminals in an amount of 5% to 50% by weight. When the content of the oxyethylene unit is in the range from 5% to 50% by weight, the raw material for a foam is readily cured to produce a foam having linked bubbles.

The polymer polyol is produced by, for example, a method of polymerizing an ethylenically unsaturated monomer such as styrene and acrylonitrile in the presence of a polyether polyol, a method of mixing a polymer fine particle which is prepared separately using an ethylenically unsaturated monomer such as styrene and acrylonitrile, with a polyether polyol, a method of polymerizing a macromonomer having an ethylenically unsaturated group and an ethylenically unsaturated monomer in a polyether polyol, or the like. Among these polyols, preferred is a polyol produced by polymerizing an ethylenically unsaturated monomer in the presence of a polyether polyol, and more preferred is a polyol produced by polymerizing an ethylenically unsaturated monomer in the presence of polyoxypropylene triol. In the method of mixing polymer fine particles, the amount of the polymer fine particles to be used is preferably 50 parts or less by weight, and particularly 30 parts or less by weight, based on 100 parts by weight of the polyether polyol. When the amount of the polymer fine particles is more than 50 parts by weight, the resultant polymer polyol may have a high viscosity, and workability during foaming may be deteriorated.

Examples of the polyester polyol include a polyester polyol produced by dehydration condensation reaction between a polycarboxylic acid such as succinic acid, adipic acid, sebacic acid, azelaic acid, terephthalic acid, isophthalic acid, orthophthalic acid and trimellitic acid, an acid ester or an acid anhydride, and a low molecular weight alcohol such as ethylene glycol, 1,2-propane diol, 1,2-butane diol, 1,5-pentane diol, 1,6-hexane diol, 3-methyl-1,5-pentane diol and neopehntyl glycol, a low molecular weight amine such as hexamethylene diamine, xylylene diamine and isophorone diamine, or a low molecular weight amino alcohol such as monoethanolamine and diethanolamine; a lactone-based polyester polyol produced by ring-opening polymerization of a cyclic ester such as ε-caprolactone and γ-valerolactone in the presence of a low molecular weight alcohol or a low molecular weight amino alcohol as an initiator; a polyester amide polyol; and the like.

The castor oil polyol is a polyol produced by addition of an alkylene oxide having 2 to 4 carbon atoms to castor oil. The rate of primary hydroxyl group is preferably 10 mol % or more from the viewpoint of curability of the raw material for a foam. The hydroxyl value is preferably in the range from 20 to 350 mg KOH/g. Examples of the alkylene oxide include EO, PO, tetrahydrofuran and the like. The alkylene oxide makes it possible to perform random or block addition to castor oil. The alkylene oxide may be used singly or in combination of two or more types thereof.

As mentioned above, the castor oil polyol is preferably used with other polyol.

The mixing ratio between the castor oil polyol and other polyol is not particularly limited. The amounts of the castor oil polyol and other polyol are respectively preferably 15% to 50% by weight and 50% to 85% by weight, more preferably 20% to 40% by weight and 60% to 80% by weight, and further preferably 25% to 35% by weight and 65% to 75% by weight, based on 100% by weight of the total of these polyols. When the amounts of the castor oil polyol and other polyol are 15% to 50% by weight and 50% to 85% by weight respectively, the raw material for a foam is readily cured, and a polyurethane foam layer can be obtained having excellent repulsion elasticity, small compression residual strain, and sufficient hardness.

The polyisocyanate is preferably used in combination of a diphenylmethane diisocyanate-based compound and a tolylene diisocyanate-based compound. Examples of the diphenylmethane diisocyanate-based compound include 2,2'-diphenylmethane diisocyanate, 2,4'-diphenylmethane diisocyanate, 4,4'-diphenylmethane diisocyanate, polymethylene polyphenylene polyisocyanate, and urethane-modified derivatives thereof. Additionally, examples of the tolylene diisocyanate-based compound include 2,4-tolylene diisocyanate, 2,6-tolylene diisocyanate and carbodiimide-modified derivatives thereof. The mixing ratio between the diphenylmethane diisocyanate-based compound and tolylene diisocyanate-based compound is not particularly limited. The amounts of the diphenylmethane diisocyanate-based compound and tolylene diisocyanate-based compound are respectively preferably 55% to 95% by weight and 5% to 45% by weight, more preferably 65% to 85% by weight and 15% to 35% by weight, and further preferably 25% to 75% by weight and 25% to 75% by weight, based on 100% by weight of the total of these diisocyanates. When the amounts of the diphenylmethane diisocyanate-based compound and tolylene diisocyanate-based compound are 55% to 95% by weight and 5% to 45% by weight respectively, the raw material for a foam is readily cured, and a polyurethane foam layer can be obtained having excellent repulsion elasticity, small compression residual strain, and sufficient hardness. Other polyisocyanate in addition to the diphenylmethane diisocyanate-based compound and tolylene diisocyanate-based compound may be used as the polyisocyanate. In this case, the content of the other polyisocyanate is preferably 10% or less by weight, and particularly 5% or less by weight, based on 100% by weight of the total amount of the polyisocyanate.

The crosslinker is not particularly limited and widely known crosslinker for the formation of a polyurethane foam can be used. Examples of the crosslinker include a low molecular weight alcohol, a low molecular weight amine, a low molecular weight amino alcohol and the like. The crosslinker may be used singly or in combination of two or more types thereof. Among these, a compound having a molecular weight of less than 500 and at least two active hydrogen groups is preferable. The crosslinker is preferably a low molecular weight amino alcohol which moderately reacts with an isocyanate group, and is particularly diethanolamine. The amount of the crosslinker to be used is preferably 10 parts or less by weight, and particularly 5 parts or less by weight based on 100 parts by weight of the amount of the polyol. The lower limit is usually 1 part by weight.

The catalyst is not particularly limited and widely known catalyst for the formation of a polyurethane foam can be used. Examples of the catalyst include a tertiary amine, a diazabicycloalkene and a salt thereof, an organometallic compound, and the like. The catalyst may be used singly or in combination of two or more types thereof. Among these, a tertiary amine is preferable.

Examples of the tertiary amine include triethylene diamine, triethylamine, tri-n-butylamine, bis(2-dimethylaminoethyl)ether, N,N,N',N'-tetramethylhexamethylene diamine, 1,2-dimethylimidazole, and the like.

Examples of the organometallic compound include a metal salt obtained from a metal such as tin, lead and zirconium, and an organic acid such as octane acid and naphthene acid, including dibutyltin dilaurate, dibutyltin diacetylacetonate, zirconium tetra acetylacetonate, and the like.

The amount of the catalyst to be used is preferably in the range from 0.03 to 2.0 parts by weight, and particularly from 0.03 to 1.5 part by weight based on 100 parts by weight of the polyol. When the amount of the catalyst is in the range from 0.03 to 2.0 parts by weight, the raw material for a foam is readily cured, and offers good moldability.

The blowing agent is not particularly limited and widely known blowing agent for the formation of a polyurethane foam can be used. Examples of the blowing agent include water, an inactive low boiling point solvent and a reactive blowing agent. The blowing agent may be used singly or in combination of two or more types thereof. Among these, water is often used.

Examples of the inactive low boiling point solvent include dichloromethane, hydrochlorofluorocarbon, hydrofluorocarbon, isopentane and the like.

Examples of the reactive blowing agent include a compound which is decomposed at a temperature higher than room temperature to emit gas, such as an azo compound.

The amount of the blowing agent to be used is preferably in the range from 1.0 to 5.0 parts by weight, and particularly from 1.5 to 4.0 parts by weight, based on 100 parts by weight of the polyol. When the amount of the blowing agent is in the range from 1.0 to 5.0 parts by weight, the resultant foam has isolated bubbles, and the surface thereof will not cause sinking.

The foam control agent is not particularly limited and widely known foam control agent for the formation of a polyurethane foam can be used. Examples of the foam control agent include a polydimethylsiloxane polyalkylene oxide block copolymer, a vinyl silane polyalkylene polyol copolymer, and the like. The foam control agent may be used singly or in combination of two or more types thereof.

The amount of the foam control agent is preferably 3.0 parts or less by weight, and particularly 2.0 parts or less by weight, based on 100 parts by weight of the polyol. The lower limit is usually 0.5 part by weight.

The raw material for a foam may contain an additive such as an anti aging agent including antioxidant and a ultraviolet absorber, a filler of calcium carbonate, barium sulfate, or the like, an internal release agent, a flame retardant, a plasticizer, a coloring agent and a fungicide, and auxiliary agent as necessary.

The interior material for a vehicle of the present invention is used as a constitutional part such as a door, an instrument panel, a pillar, a sun visor, a sheet back garnish, a console box, a ceil, a floor, a package tray, a switch base, a quarter panel, an arm rest, a dashboard and a deck trim.

EXAMPLE

Hereinafter, the invention will be more specifically described by way of Examples. The present invention is in no way limited by these Examples.

Example 1

The following starting materials shown in (1)-(3) were used to produce an interior material for a vehicle and evaluation was performed.
(1) Material for Forming the Skin Layer 50% by weight of an olefin-based thermoplastic elastomer (trade name "Milastomer 7030NH" manufactured by Mitsui Chemicals, Inc.), 30% by weight of a polyolefin resin (trade name "Novatec EC9" manufactured by Japan Polypropylene Corp.) which is an ethylene propylene random copolymeric resin, 10% by weight of a polylactic acid resin (trade name "Ingeo 4032D" manufactured by Nature Works LLC), and 10% by weight of a styrene-based thermoplastic elastomer (trade name "Tuftec H1052" manufactured by Asahi Kasei Chemicals Corp.) were mixed. Then the mixture was formed using an extruder into a sheet having a thickness of 0.5 mm. Subsequently, the sheet was clamped around a roll having an embossed pattern on its circumference surface thereby transferring the embossed pattern to the sheet to form a sheet for the skin layer having an embossed pattern on one surface.
(2) Material for Forming the Crosslinked Foam Layer 6 parts by weight of triallyl isocyanurate as a crosslinking aid, 9 parts by weight of azodicarbonamide as blowing agent, and 0.9 part by weight of an antioxidant were added to 100 parts by weight of the total of 30% by weight of a polylactic acid resin (trade name "Ingeo 4032D" manufactured by Nature Works LLC) and 70% by weight of a polybutylene succinate resin (trade name "Bionolle 1003" manufactured by Showa Highpolymer Co., Ltd.), and the mixture was kneaded with a mixing roll at a temperature at which the blowing agent would not be decomposed. After that, pressing was conducted under a pressure of 20 MPa to form a non-crosslinked sheet. Thereafter, the non-crosslinked sheet was irradiated with electron beams of 13 kGy to achieve crosslinking. Subsequently, the crosslinked sheet was placed in a hot air circulating foaming furnace set at 240° C., and was heated for 3 minutes to cause foaming. Thereby a crosslinked foam sheet (material for forming the crosslinked foam layer) having a thickness of 1.0 mm was obtained.
(3) Material for Forming the Base Layer Kenaf fibers cut into pieces of 70 mm as a natural fiber and polypropylene fibers cut into pieces of 51 mm were mixed, combined by an air-laid method, and sedimented to form a web. Weight ratio of kenaf fiber and polypropylene fiber is 50:50. Then two webs were entangled by needle punching to fabricate a fiber mat. Subsequently, the fiber mat was heated with a hot plate at a temperature of 235° C. until the inside temperature reached 210° C. while pressing under a pressure of 10 kg/cm$^2$, and then cooled to normal temperature to produce a fiber board (material for forming the base layer) having a thickness of 2.5 mm.

The vacuum molding method shown in FIG. 3 was applied for Example 1.

[A] Production by Vacuum Molding

The surface of the material for forming the skin layer having no embossed pattern and to be bonded to the crosslinked foam sheet was heated to 180° C., and the surface of the crosslinked foam sheet to be bonded to the material for forming the skin layer was heated to 120° C. Thereafter, these heated surfaces were bonded under pressing to form a double-layered sheet 30. Subsequently, the double-layered sheet 30 was heated such that the temperature of the side of the material for forming the skin layer in the sheet 30 was 120° C. After that an adhesive (trade name "YA211-1" manufactured by Hitachi Kasei Polymer Co., Ltd.) was coated at a coating weight of 120 g/m² onto the surface of the fiber board (material for forming base layer 131) mounted on the lower die 22, and the double-layered sheet 30 was set on (see, FIG. 3(B)). This time, the surface of the crosslinked foam sheet in the double-layered sheet 30 was mounted on the adhesive. Sucking was conducted from the lower die 22 to join the fiber board 131 and double-layered sheet 30, and an interior material for a vehicle 100 shown in FIG. 3(C) was obtained having a base layer 13a, a crosslinked foam layer 12 and a skin layer 11 sequentially (see, FIG. 3(C)). It is noted that formed embossed pattern is not indicated in FIG. 3(C).

[B] Evaluation of the Interior Material for Vehicle

Following items (i)-(iv) were evaluated for the produced interior material for a vehicle. The evaluation results are shown in Table 1.

(i) Wrinkling

The surface of the skin layer of the interior material for a vehicle was visually observed to examine the presence or absence of wrinkles. In Table 1, "1" indicates that no wrinkle was observed, and "2" indicates that wrinkling was observed.

(ii) Depth of Emboss

The surface roughness of the skin layer for the interior material for a vehicle was measured using a surface roughness measuring instrument (type name "Surfcom 570" manufactured by Tokyo Seimitsu Co., Ltd.), under conditions that the measuring length was 12.5 mm, the measurement rate was 0.3 mm/S, and the cutoff value was 2.5 mm, and the depth was calculated as the sum of the maximum peak height and maximum valley depth in the measured range.

(iii) Light Resistance

A sample having a width of 70 mm and a length of 200 mm was cut out from the interior material for a vehicle. The sample was irradiated with ultraviolet light for 1,000 hours using an ultraviolet fade meter (type name "U48AU" manufactured by Suga Test Instruments Co., Ltd.) with one carbon arc light, under conditions that the internal temperature was 60° C., the internal humidity was 50% RH, the black panel temperature was 83° C., and the sample rotation speed was 3 rpm, whereby the degree of discoloration and deterioration was examined. In Table 1, "1" indicates that no marked discoloration or deterioration was observed.

(iv) Moldability

The interior material for a vehicle was visually observed from the skin layer side to examine floating, exfoliation between the skin layer and the crosslinked foam layer or polyurethane foam layer (for Example 5), and the presence or absence of lack of hiding due to the concave-convex on the base layer. In Table 1, "1" indicates that no floating, exfoliation, or lack of hiding was observed, and "2" indicates that floating, exfoliation, and lack of hiding were all observed.

Example 2

Production and evaluation of the interior material for a vehicle was conducted in the same manner as in Example 1 except that a material for forming the skin layer having an embossed pattern containing the olefin-based thermoplastic elastomer, polyolefin resin, polylactic acid resin and styrene-based thermoplastic elastomer in amounts of, respectively 50% by weight, 20% by weight, 20% by weight, and 10% by weight, was used. The evaluation results are shown in Table 1.

Example 3

Production and evaluation of the interior material for a vehicle was conducted in the same manner as in Example 1 except that a material for forming the skin layer having an embossed pattern containing the olefin-based thermoplastic elastomer, polyolefin resin, polylactic acid resin and styrene-based thermoplastic elastomer in amounts of, respectively 50% by weight, 10% by weight, 30% by weight, and 10% by weight, was used. The evaluation results are shown in Table 1.

Example 4

The vacuum molding method shown in FIG. 4 was applied.

The olefin-based thermoplastic elastomer, polylactic acid resin and styrene-based thermoplastic elastomer were used in an amount of 30% by weight, 20% by weight and 20% by weight, respectively to fabricate a sheet-form material for forming the skin layer having no embossed pattern. And then the sheet was used in the same manner as in Example 1 to form a double-layered sheet 30.

After that, the double-layered sheet 30 was heated such that the temperature of the side of the material for forming the skin layer in the sheet 30 was 180° C. The sheet 30 was sucked toward the upper die 21 shown in FIG. 4(A) to form an embossed pattern on the surface of the skin layer 111 (see, FIG. 4(B)). Subsequently, a fiber board 131 on which an adhesive manufactured by Hitachi Kasei Polymer Co., Ltd. was coated was used in the same manner as in Example 1, and then the upper die 21 and lower die 22 were clamped (see, FIG. 4(C)). And an interior material for a vehicle 100 shown in FIG. 4(D) was obtained having a base layer 13a, a crosslinked foam layer 12 and a skin layer 11 sequentially. It is noted that formed embossed pattern is not indicated in FIG. 4(D). The evaluation results are shown in Table 1.

Example 5

The integral foam forming method shown in FIG. 4 was applied.

A sheet-form material for forming the skin layer having the same constitution as that in Example 2, and having a thickness of 1.0 mm was formed in the same manner as in Example 1. The sheet for forming the skin layer was heated such that the surface having no embossed pattern was 70° C. After that, the sheet for forming the skin layer 111 was mounted on a lower die 32 such that the heated surface faces the inner surface of the lower die 32, and sucked. Thereby the sheet for forming the skin layer 111 was tightly attached to the lower die 22.

Subsequently, a support plate 141 having a through hole and having a thickness of 3.0 mm was mounted on the top surface of the sheet for forming the skin layer 111, and then closed with the upper die 31 (see, FIG. 5(B)). A raw material for a foam described later was injected from a raw material inlet 16 provided on the upper die 31, and the raw material was kept at a temperature of 60° C. for 6 minutes to proceed reaction and curing. Thereby a polyurethane foam 15 was formed (see, FIG. 5(C)). Subsequently, the upper die 31 and lower die 32 were opened to obtained an interior material for a vehicle 200 having a polyurethane foam layer 13b, a support layer 14, and a skin layer 11 sequentially (see, FIG. 5(D)).

It is noted that the raw material inlet 16 is formed such that the through hole at the center of the upper die 31 is communicated with the through hole at the center of the support plate 141.

The evaluation results are shown in Table 1.

The components in the raw material for a foam are as follows.

(a) Polyol

22% by weight of polyether polyol "EL-838" (trade name) manufactured by Asahi glass Co., Ltd.; 45% by weight of polymer polyol "EL-937" (trade name) manufactured by Asahi glass Co., Ltd.; 3% by weight of polyether polyol which is a polyol obtained by random addition polymerization of EO and PO to pentaerythritol, and has an average functional group number of 4.0, and a hydroxyl value of 28 mg KOH/g; and 30% by weight of castor oil polyol which is a polyol obtained by addition reaction of EO to castor oil, and has an average functional group number of about 3, a hydroxyl value of 59 mg KOH/mg, and a rate of primary hydroxyl group terminated is preferably 62 mol %, are mixed.

(b) Polyisocyanate

It is a mixture of the following polyisocyanate (b1), (b2) and (b3) in amounts of 40% by weight, 30% by weight, and 30% by weight, respectively. The polyisocyanate for the raw material for a foam was used with the polyol in an amount such that the isocyanate index was 85.

(b1) Diphenylmethane Diisocyanate-Based Polyisocyanate

It is a polyisocyanate produced by reacting a mixture of 11% by weight of 2,4'-diphenylmethane diisocyanate and 89% by weight of 4,4'-diphenylmethane diisocyanate with a polyoxyethylene polyoxypropylene polyol obtained by reaction between PO and EO at weight ratio of 80/20.

(b2) Diphenylmethane Diisocyanate-Based Polyisocyanate

It is a mixture of 4.1% by weight of 2,4'-diphenylmethane diisocyanate, 32.9% by weight of 4,4'-diphenylmethane diisocyanate, and 63% by weight of poly(methylene) polyphenylene polyisocyanate.

(b3) Tolylene Diisocyanate (c) Catalyst 0.4 part of "TEDA-L33" (trade name) manufactured by Tosoh Corp., and 0.06 part of "TOYOCAT ET" (trade name) manufactured by Tosoh Corp. are in combination.

(d) Blowing Agent

It is 2.75 parts of water.

(e) Foam Control Agent

It is 1 part of "SZ-1306" (trade name) manufactured by Nippon Unicar Co., Ltd.

The amounts of the catalyst, foaming agent and foam control agent to be used are ones based on 100 parts by weight of the polyol.

Comparative Example 1

Production and evaluation of the interior material for vehicle were conducted in the same manner as in Example 1 except that a skin layer consisting of 60% by weight of olefin-based thermoplastic elastomer and 40% by weight of polyolefin resin was used. The evaluation results are shown in Table 1.

Comparative Example 2

Production and evaluation of the interior material for vehicle were conducted in the same manner as in Example 1 except that a skin layer consisting of 50% by weight of olefin-based thermoplastic elastomer and 50% by weight of polyolefin resin was used. The evaluation results are shown in Table 1.

Comparative Example 3

Production and evaluation of the interior material for vehicle were conducted in the same manner as in Example 1 except that a skin layer consisting of 56% by weight of olefin-based thermoplastic elastomer, 22% by weight of polyolefin resin, and 22% by weight of polylactic acid resin was used. The evaluation results are shown in Table 1.

TABLE 1

| | | Example | | | | | Comparative Example | | |
|---|---|---|---|---|---|---|---|---|---|
| | | 1 | 2 | 3 | 4 | 5 | 1 | 2 | 3 |
| Composition of skin layer (wt %) | TPO | 50 | 50 | 50 | 30 | 50 | 60 | 50 | 56 |
| | EP random copolymeric resin | 30 | 20 | 10 | 30 | 20 | 40 | 50 | 22 |
| | PLA | 10 | 20 | 30 | 20 | 20 | — | — | 22 |
| | Styrene-based elastomer | 10 | 10 | 10 | 20 | 10 | — | — | — |
| Crosslinked foam layer | | present | present | present | present | none | present | present | present |
| Base layer | | Composite material | Composite material | Composite material | Composite material | Foam | Composite material | Composite material | Composite material |
| Characterization | Wrinkling | 1 | 1 | 1 | 1 | 1 | 1 | 1 | 2 |
| | Depth of emboss (μm) | 149.3 | 158.1 | 162.4 | 168.2 | 158.1 | 146.4 | 150.2 | 139.0 |
| | Light resistance | 1 | 1 | 1 | 1 | 1 | 1 | 1 | 1 |
| | Moldability | 1 | 1 | 1 | 1 | 1 | 1 | 1 | 2 |

"TPO" means olefin-based thermoplastic elastomer,
"EP random copolymeric resin" means ethylene propylene random copolymeric resin,
"PLA" means polylactic acid resin, and
"Styrene-based elastomer" means styrene-based thermoplastic elastomer.
"Composite material" means a material including thermoplastic resin and kenaf fiber, and
"Foam" means polyurethane foam.

The results listed in Table 1 indicate that Examples 1 to 5 acquired no wrinkle irrespective of the type of the substrate layer and the vacuum forming process, and showed good light resistance, caused no discoloration or deterioration, and offered good formability in spite of the inclusion of a polylactic acid resin. It is also indicated that the automobile interior materials had great concave-convex depths and good design features.

On the other hand, Comparative Examples 1 and 2, which used no polylactic acid resin or styrene thermoplastic elastomer for the formation of the skin layer, acquired no wrinkle and showed good light resistance and formability, but all the raw materials are derived from petroleum. Comparative Example 3, which used a polylactic acid resin but no styrene thermoplastic elastomer for the formation of the skin layer, showed good light resistance, but acquired wrinkles and offered unacceptable formability.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. An interior material for a vehicle, comprising:
   a base layer; and
   a skin layer affixed to the base layer, wherein:
     said skin layer comprises an olefin-based thermoplastic elastomer, a polyolefin resin, a polylactic acid resin and a styrene-based thermoplastic elastomer, wherein said skin layer has a shore A hardness in the range of 70 to 90, and
   contents of said olefin-based thermoplastic elastomer, said polyolefin resin, said polylactic acid resin and said styrene-based thermoplastic elastomer are respectively 20% to 70% by weight, 10% to 50% by weight, 5% to 30% by weight and 5% to 30% by weight based on 100% by weight of the total of said olefin-based thermoplastic elastomer, said polyolefin resin, said polylactic acid resin and said styrene-based thermoplastic elastomer.

2. The interior material for a vehicle according to claim 1, wherein said base layer comprises a natural fiber and a thermoplastic resin.

3. The interior material for a vehicle according to claim 2, wherein said thermoplastic resin is at least one resin selected from the group consisting of a polyolefin resin and a polylactic acid resin.

4. The interior material for a vehicle according to claim 2, wherein said thermoplastic resin is a polyolefin resin.

5. The interior material for a vehicle according to claim 2, wherein a crosslinked foam layer is provided between said skin layer and said base layer.

6. The interior material for a vehicle according to claim 5, wherein said crosslinked foam layer is formed using a polylactic acid resin.

7. The interior material for a vehicle according to claim 1, wherein said base layer comprises a polyurethane foam layer.

8. The interior material for a vehicle according to claim 7, wherein said polyurethane foam layer is obtained using a plant-derived material.

9. The interior material for a vehicle according to claim 7, wherein a support layer is provided on said polyurethane foam layer on the opposite side to the surface facing said skin layer.

10. The interior material for a vehicle according to claim 8, wherein a support layer is provided on said polyurethane foam layer on the opposite side to the surface facing said skin layer.

* * * * *